(12) United States Patent
Beutler

(10) Patent No.: US 9,067,281 B2
(45) Date of Patent: Jun. 30, 2015

(54) LASER CUTTING SYSTEM FOR CUTTING A WORKPIECE WITH A LASER BEAM AT A VARIABLE CUTTING SPEED

(75) Inventor: Beat Beutler, Oberönz (CH)

(73) Assignee: BYSTRONIC LASER AG, Niederonz (CH)

( * ) Notice: Subject to any disclaimer, the term of this patent is extended or adjusted under 35 U.S.C. 154(b) by 1071 days.

(21) Appl. No.: 13/063,267

(22) PCT Filed: Sep. 9, 2009

(86) PCT No.: PCT/CH2009/000301
§ 371 (c)(1),
(2), (4) Date: Jun. 3, 2011

(87) PCT Pub. No.: WO2010/028514
PCT Pub. Date: Mar. 18, 2010

(65) Prior Publication Data
US 2011/0220623 A1    Sep. 15, 2011

(30) Foreign Application Priority Data

Sep. 11, 2008    (EP) .................................... 08405223

(51) Int. Cl.
*B23K 26/38*    (2014.01)
*B23K 26/08*    (2014.01)
(Continued)

(52) U.S. Cl.
CPC ............ *B23K 26/38* (2013.01); *B23K 26/0876* (2013.01); *B23K 26/0884* (2013.01);
(Continued)

(58) Field of Classification Search
CPC ........... B23K 26/0876; B23K 26/0884; B23K 26/14; B23K 26/38; G05B 19/4163; G05B 2219/35398; G05B 2219/36283; G05B 2219/45041

USPC ............ 219/121.62, 121.67, 121.81, 121.83, 219/121.84, 121.61; 700/166
See application file for complete search history.

(56) References Cited

U.S. PATENT DOCUMENTS 4,555,610 A * 11/1985 Polad et al. ............... 219/121.62
5,012,069 A *  4/1991 Arai .......................... 219/121.62
(Continued)

FOREIGN PATENT DOCUMENTS

CN    101025576 A     8/2007
EP    0 506 968       10/1992
(Continued)

OTHER PUBLICATIONS

International Preliminary Report on Patentability based on PCT/CH2009/000301 dated Apr. 5, 2011.
(Continued)

*Primary Examiner* — Geoffrey S Evans
(74) *Attorney, Agent, or Firm* — Venable LLP; Jeffri A. Kaminski

(57) ABSTRACT

The laser cutting system for cutting a workpiece with a laser beam along a cutting line at a variable cutting speed includes a movable machining head for placing the laser beam on the respective workpiece, a user interface for specifying the respective cutting line and for specifying a minimum path accuracy of the laser beam, and a control device for controlling a movement of the machining head along the cutting line relative to the respective workpiece and for controlling a plurality of process variables of a cutting process. A second subset of the process variables comprises exclusively one or more process variables which have no influence on the power of the laser beam available for cutting. At least one process variable of the second subset can be controlled by way of the control device as a function of at least one variable control parameter.

16 Claims, 6 Drawing Sheets

(51) Int. Cl.
  *B23K 26/14*  (2014.01)
  *G05B 19/416*  (2006.01)

(52) U.S. Cl.
  CPC ............ *B23K26/14* (2013.01); *G05B 19/4163* (2013.01); *G05B 2219/35398* (2013.01); *G05B 2219/36283* (2013.01); *G05B 2219/45041* (2013.01)

(56) References Cited

U.S. PATENT DOCUMENTS

| | | |
|---|---|---|
| 5,252,805 A | 10/1993 | Nakata et al. |
| 5,688,418 A | 11/1997 | Yoshiyasu |
| 6,091,749 A * | 7/2000 | Hoffmaster et al. ........ 372/38.02 |
| 6,777,641 B2 * | 8/2004 | Cole et al. ................ 219/121.67 |
| 2005/0205537 A1 * | 9/2005 | Penz et al. ................ 219/121.72 |

FOREIGN PATENT DOCUMENTS

| | | |
|---|---|---|
| JP | 06 277860 | 10/1994 |
| JP | 06-277860 A * | 10/1994 |
| JP | 07 195186 | 8/1995 |
| JP | 07-195186 A * | 8/1995 |
| JP | 2007-216263 A | 8/2007 |

OTHER PUBLICATIONS

International Search Report dated Nov. 9, 2009 issued from European Patent Office.

* cited by examiner

LASER CUTTING SYSTEM FOR CUTTING A WORKPIECE WITH A LASER BEAM AT A VARIABLE CUTTING SPEED

The invention relates to a laser cutting system for cutting a workpiece with a laser beam along a cutting line at a variable cutting speed.

When cutting a workpiece with a laser beam, a laser beam is typically focused onto the surface of the workpiece and the workpiece is thereby locally heated such that the workpiece melts in the vicinity of the focal point of the laser beam until a continuous hole is created. In the event that the focused laser beam is additionally moved relative to the workpiece, the workpiece can accordingly be severed (cut) along the entire path, which the laser beam covers in response to the movement on the workpiece. More or less smooth cutting surfaces are thereby created substantially parallel to the direction of propagation of the laser beam and along the path, which the laser beam covers in response to the cutting. The area of the workpiece, which is removed with the laser beam in response to the cutting, shall be identified hereinbelow as "cutting path" of the laser beam.

As is well known, the respective cutting process can be influenced by means of process gases. For this purpose, one or a plurality of process gases are typically allowed to flow from nozzles, which are directed to the vicinity of the focal point of the laser beam, under a pressure on the material, which has melted under the impact of the laser beams. This can influence the efficiency of the cutting and the respective quality of the created cutting surfaces (e.g. in view of the roughness thereof).

As a rule, commercial laser cutting systems are to be designed flexibly to being capable of taking care of a plurality of tasks—independent on the respective demand of a user: for example, they are to be capable of cutting workpieces of different thicknesses and made from different materials and they are to be suitable to create contours having random shapes (e.g. straight contours, round contours, contours having one or a plurality of corners) and different dimensions (small contours, large contours), and this preferably at a high quality (the cutting surfaces are to be as planar and even as possible) and at a high cutting speed (the feed in the direction of movement of the laser beam is to be as large as possible per time unit).

To be able to satisfy these objects, a laser cutting system typically has a movable machining head for placing the laser beam on the respective workpiece, with said machining head comprising an adjustable focusing optics and a device for admitting process gases to the respective workpiece. A user interface is furthermore usually available for specifying the respective "cutting line", that is, a user can define the geometric shape of a contour, which a workpiece is to attain ideally during a cutting process, via this user interface. As a rule, a laser cutting system furthermore has a control device for controlling a movement of the machining head along the respectively specified cutting line relative to the respective workpiece and for controlling a plurality of process variables of a cutting process.

By controlling the movement of the machining head, it is attained that a cutting path of the laser beam can be created along the cutting line during the cutting process. As a rule, laser cutting machines have a numerical path control for the machining head. As a rule, the designation of a "minimum path accuracy" of the laser beam, that is, the designation of an admissible maximum deviation of the cutting path of the laser beam from the respectively specified cutting line is sufficient to carry out the path control. Based on this designation, the control can control the respective location of the machining head and the respective feed or the speed, respectively.

The control of the process variables of the cutting process represents a particular challenge, that is, the control of all parameters, which—aside from the control of the movement of the machining head (path control)—influence the result of the cutting process. This is to say, it turned out that a set of process parameters, which is optimal for any application (independent from the shape and size of the contour, which is to be cut, and independent from the thickness and the material of the respective workpiece), does not exist.

For example, it is possible to specify a set of process parameters (e.g. laser power, adjustment of the focusing optics and parameters of the supply with process gases), on the basis of which long, straight or approximately straight contours, respectively, can be cut at a high speed (that is, with a large feed per time unit), in particular in the case of thin metal sheets having a thickness of less than 2 mm. "Straight or approximately straight contours, respectively" is to identify that the corresponding cutting line does not have a change in direction (that is, adjacent sections of the cutting line are located on a straight line) or only a "small" change in direction (that is, even though adjacent sections of the cutting line are not located on a straight line, their directions, however, deviate from one another only by a "small" angle of less than 1°). In the event that the predetermined cutting line requires a "large" change in direction of the machining head (for example in the case of a movement around a corner with an angle of 90° or more), the path control of the machining head then leads to a large deviation from the predetermined cutting line in response to an excessive speed of the machining head during the change in direction. In this case, the contour of the created cutting edge for the most part does not fulfill the demands on the accuracy. However, in the event that the "large" change in direction is carried out at a reduced speed, which, due to the path control, leads to a smaller (minimal, if necessary) deviation from the cutting line in the area of the change in direction, but maintains the same set of process parameters, on the basis of which long, straight or approximately straight contours, respectively, can be cut at a high speed, one typically obtains defective cutting edges with an unacceptable roughness in the area of the change in direction.

JP 07 195186 discloses a laser machining machine, in the case of which machine settings, such as laser power, frequency, operating type, type of the process gas, gas pressure, etc. are maintained when a speed is reduced in the direction of a corner point P5. During the corner machining, when the speed in the corner point P5 is kept at zero for a predetermined dwell time T3, the settings are changed. In the event that the speed is increased again, the settings are reset again to the settings, which were present prior to the speed reduction.

U.S. Pat. No. 5,688,418 discloses a laser cutting method with two groups of different cut settings. The first group of cut settings is used for cutting a workpiece close to the end point of a cut. The second group of cut settings is used for cutting the workpiece between this end point of the cuts, along the periphery of a hole and a point close to the end point of the cut. The focusing position of the laser remains the same in both settings. Other settings of the two groups also remain unchanged.

EP 0 506 968 A1 discloses a method for cutting a workpiece along a line, which has a corner (change in direction). According to this method, the speed of the machining head is reduced during the movement in the direction towards the corner, wherein the power of the laser beam, which is available for cutting, is reduced at the same time. The speed of the machining head is increased again accordingly during the movement away from the corner, wherein the power of the laser beam, which is available for cutting, is increased at the same time. By simultaneously reducing the speed of the machining head and the power of the laser beam, the thermal stress of the workpiece decreases during the machining of the corner. Even though the quality of the cutting surfaces is improved through this in the area of the corner, the quality improvement is limited, however, particularly because considerable irregularities of the cutting surfaces appear nonetheless in the area of the corner. Other parameters of a cutting process than the power of the laser beam, which is available for cutting, are not used in this method for the optimization.

In the case of conventional laser cutting systems, the user of the system mostly has the opportunity to additionally make certain determinations with reference to the respective process variables of the cutting process in response to a programming of an application, which in each case determines the cutting line, which is to be machined in each case in the cutting process, and to thus optimize the respective cutting process with reference to the respective cutting line via the user interface. It is possible, for example, to break down the machining of the cutting line into certain sections when programming the respective application, and to determine different process parameters for different sections. To optimize the cutting process in the case of a cutting line, which has a change in direction, the user can specify, for example, one or a plurality of sections of the cutting line in the vicinity of a change in direction (for example by specifying a starting point and an end point of the respective section or by specifying a time period, which the machining head requires to pass through the specified section) and can initiate a change of the speed of the machining head or changes of certain process variables of the cutting process, for example a change of the pressure of a process gas or of the power of the laser beam for each of these sections, for example. In this case, the respective changes of the process variables of the cutting process are not correlated with the current speed of the machining head, because the changes of the speed of the machining head and changes of the process variables of the cutting process are controlled independent on one another. This type of influencing of a user via the user interface is associated with a number of disadvantages. On the one hand, the user must have the necessary technological know-how with reference to the respective cutting process, so as to be able to optimize the process flow at all. This optimization would furthermore have to be programmed individually for each cutting line via the user interface, namely individually for each change in direction, even if one cutting line has a plurality of identical changes in direction in different sections of the cutting line (for example a plurality of corners with identical angles). This type of optimization is therefore extremely extensive, even when the user has the necessary know-how with reference to the cutting process.

The invention is thus based on the object of avoiding the mentioned disadvantages and to create a laser cutting system, which makes it possible for a user with relatively small effort to attain cutting surfaces, which are as even as possible at a relatively high average cutting speed, in particular in cases, in which a workpiece is to be cut at a variable cutting speed, for example in response to the cutting along cutting lines having large changes in direction or with a plurality of changes in direction, respectively.

This object is solved by means of a laser cutting system with the features of claim 1.

The laser cutting system according to the invention is designed for cutting a workpiece with a laser beam along a cutting line at a variable cutting speed and comprises a movable machining head for placing the laser beam on the respective workpiece, a user interface for specifying the respective cutting line and for specifying a minimum path accuracy of the laser beam, and a control device for controlling a movement of the machining head along the cutting line relative to the respective workpiece and for controlling a plurality of process variables of a cutting process, wherein a cutting path of the laser beam along the cutting line can be created in response to the movement of the machining head during the cutting process.

In this context, a differentiation is made between two different groups of process variables of the respective cutting process. A first subset of the process variables comprises exclusively one or a plurality of process variables, which influence the power of the laser beam available for cutting. A second subset of the process variables comprises exclusively one or a plurality of process variables, which do not influence the power of the laser beam available for cutting. Those variables, which are controlled by the control device and which relate to a control of the respective path of the machining head relative to the workpiece (that is, parameters of a path control) are not considered to be process variables of a cutting process in this context.

The respective movement of the machining head can be controlled by the control device during the cutting process such that the cutting path of the laser beam follows the cutting line within the minimum path accuracy, wherein a kinematic state of the machining head can be changed by increasing or reducing the speed of the machining head relative to the workpiece. The respective change of the speed of the machining head is a basic condition for maintaining predetermined tolerances with reference to a deviation of the cutting path of the laser beam from the respective cutting line, which is specified via the user interface.

The control device furthermore comprises registering means for registering a change of the kinematic state of the machining head and/or at least of a value of the speed of the machining head and/or of a value for a change of the speed of the machining head. The control device thus has information relating to the current speed of the machining head relative to the workpiece, at least for the points in time at which corresponding speed values were detected by the respective registering means.

The control device is furthermore designed such that at least one process variable of the first subset can be changed by means of the control device in response to or after a change of the kinematic state of the machining head depending on at least one of the respectively registered values for the speed of the machining head and/or of at least one of the respectively registered values for a change of the speed of the machining head. A change of the power of the laser beam available for cutting is thus correlated to the current speed of the machining head relative to the workpiece.

According to the invention, at least one process variable of the second subset can be changed by means of the control device in response to or after a change of the kinematic state of the machining head depending on the speed of the machining head, wherein the respective change of the respective process variable can be controlled depending on at least one variable control parameter, the respective value of which can be determined by the control device based on rules implemented in the control device depending on at least one of the respectively registered values of the speed of the machining head and/or of at least one of the respectively registered values for a change of the speed of the machining head.

The control device of the laser cutting system according to the invention has the advantage that a user must supply user data to the laser cutting system for specifying an application only via the user interface, which defines a cutting line (that is, the geometry of the contour of a piece, which is to be cut) and a minimum path accuracy (that is, an admissible tolerance with reference to the deviation of the cutting path of the laser beam from the cutting line specified by the user). The control device of the laser cutting system can control the machining of a workpiece solely on the basis of these user data and can optimize process variables of the cutting process during the machining.

Initially, it is ensured that the control device varies the respective speed of the machining head within a predetermined speed range in the event of a cutting line, which comprises at least one change in direction, so as to be able to maintain a predetermined tolerance with reference to the deviation of the cutting path of the laser beam and of the respectively specified cutting line, in particular in the area of one of the respective changes in direction.

It is furthermore ensured that, in addition to a process variable of the first subset, the control device can also automatically change at least one process variable of the second subset in the event of a change of the speed of the machining head for the purpose of an optimization. The respective change of the respective process variables are thereby correlated with a single parameter: the current speed of the machining head.

Due to the fact that the respective change of the respective process variable can be controlled depending on at least one variable control parameter, and the respective value, of this control parameter can be determined by the control device based on rules implemented in the control device depending on at least one of the respectively registered values of the speed of the machining head and/or of at least one of the respectively registered values for a change of the speed of the machining head, it is ensured that the control device can specifically change the respective process variables in the case of any cutting lines (independent on the respective shape and size of the contour of the piece, which is to be cut) during the cutting process, without the user having to provide information relating to the change of the process variables to the control device via the user interface.

Due to the fact a workpiece with the laser cutting system according to the invention can be cut at a variable cutting speed and that in addition an automatic adaptation of process variables of the first subset and of the second subset to the current speed of the machining head is ensured, it is possible, in particular, for cuts along cutting lines with large changes in direction or with a plurality of changes in direction, respectively, to be carried out within a shorter time, wherein the quality of the respective cutting surface is optimized across the entire length of the cutting line. In so doing, particularly even cutting surfaces can be attained with high efficiency and with relatively small effort for the user even in the case of cutting lines having large changes in direction or having a plurality of changes in direction, respectively.

The following process variables belong to the first subset of the process variables, in particular: the power of the laser beam, a pulse duration of a laser pulse, a chronological spacing between subsequent laser pulses and/or a laser pulse rate.

The following process variables belong to the second subset of the process variables, in particular: a specification of a position of a focusing optics for focusing the laser beam relative to the workpiece, a specification of a beam diameter of the laser beam, specification of an operating mode of a laser for creating the laser beam, a specification of a path accuracy, a spatial displacement of a focal point of the laser beam relative to the cutting line, a position of a process gas nozzle relative to the workpiece, specification of a type of a process gas, a pressure of a process gas.

In an embodiment of the laser cutting system according to the invention, the respective process variable can be influenced with at least one actuator, which is be assigned to this process variable, and the respective actuator can be controlled by means of a control signal, which can be created by the control device and which represents a setpoint value of the process variable, wherein the setpoint value is the variable control parameter. It is thus assumed that the setpoint value of the respective process variable is a function of the speed of the machining head.

A functional dependency of the setpoint value of the process variable on the speed of the machining head in the control device is furthermore implemented for the respective process variable. A realization of an implementation of such a functional dependency is possible in a plurality of ways. For example, a storage, which can be accessed by the control device and in which the respective values, which the respective setpoint value assumes for certain values of the speed of the machining head or for certain ranges of this speed are stored, can be considered to be an alternative. Additional values can be determined by interpolation or extrapolation of the stored values. Another alternative is an implementation of a mathematical algorithm, for example, which can be carried out by the control device and which in each case assigns the value, which the setpoint value assumes for the respective value of the speed or for the respective range of the speed, to a value of the speed of the machining head or to a range of speeds. The control device can use the algorithm during operation of the laser cutting system so as to determine the respective setpoint value in each case for the respectively registered values of the speed of the machining head.

The functional dependency of the respective setpoint values on the speed of the machining head can in each case be determined experimentally and can subsequently be implemented in the control device. The respective setpoint values can in each case be different for workpieces with a different thickness and for different materials. Provision can therefore be made in the control device for different sets of setpoint values for workpieces with a different thickness and for different materials.

To make it possible to adapt the respective process variable to the respective speed of the machining head, the control device can create at least one control signal for controlling the actuator, which is assigned to this process variable, with said control signal representing that setpoint value of the respective process variable, which is assigned to one of the respectively registered values for the speed of the machining head according to the implemented functional dependency of the setpoint value of the respective process variable on the speed of the machining head. Due to the fact that the control device in each case obtains information relating to the current speed of the machining head during a cutting process by means of the registering means, the control device can automatically and independently determine (that is, without further information from the user in context with the specification of the respective cutting line) the respective setpoint value of the process variable by means of the functional dependency of the setpoint value of the process variable on the speed, which is implemented in the control device, and can create corresponding control signals, which represent the respective setpoint value, for controlling the respective actuator.

Further details of the invention and in particular exemplary embodiments of the device according to the invention and of the method according to the invention will be explained below by means of the enclosed drawings:

FIG. 1 shows a schematic illustration of a laser cutting system according to the invention for cutting a workpiece with a laser, a machining head, a user interface for specifying a cutting line, a control device for controlling a movement of the machining head along the cutting line relative to the respective workpiece and for controlling a plurality of process variables of a cutting process and of actuators, which can be controlled by the control device, for influencing the respective process variables;

Figure 1:
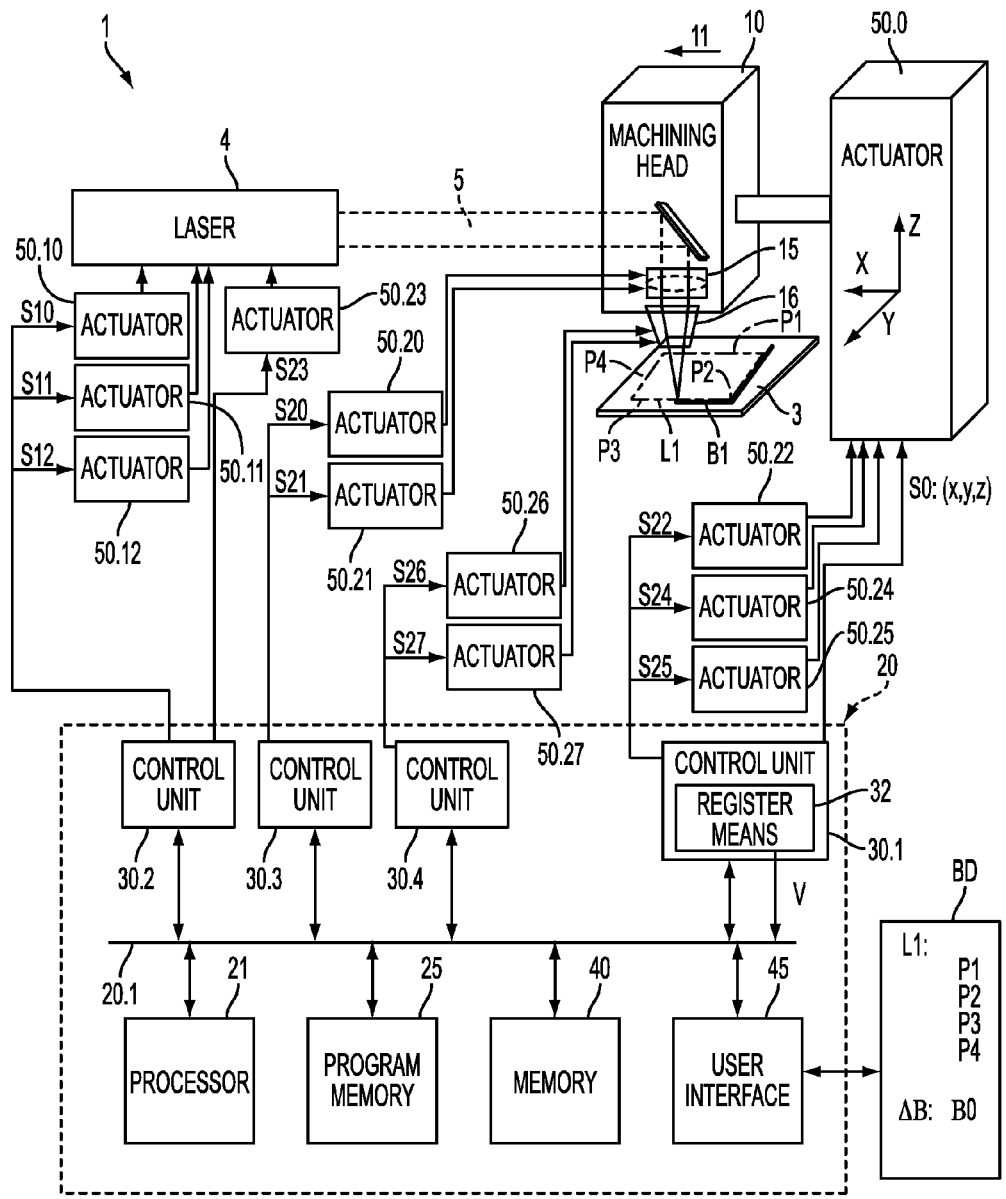
Figure 2:
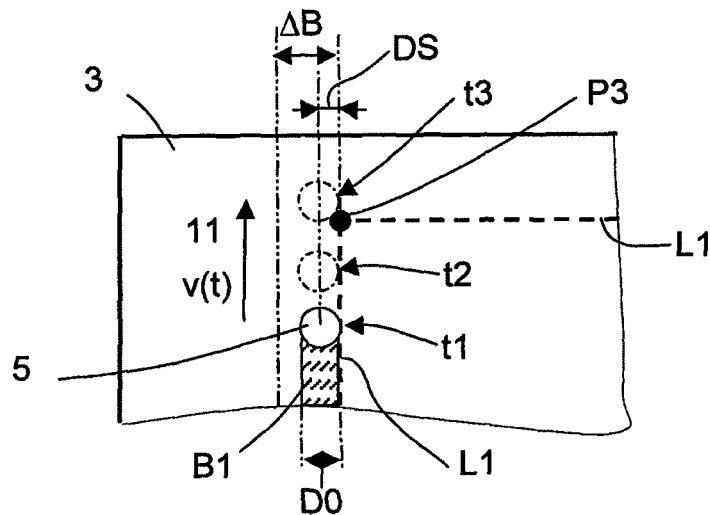
FIG. 2 shows a schematic illustration of a cutting line with a change in direction in the form of a corner on a workpiece and a cutting path of a laser beam, which follows the cutting line, and of the respective position of the laser beam for different points in time.
Figure 4:
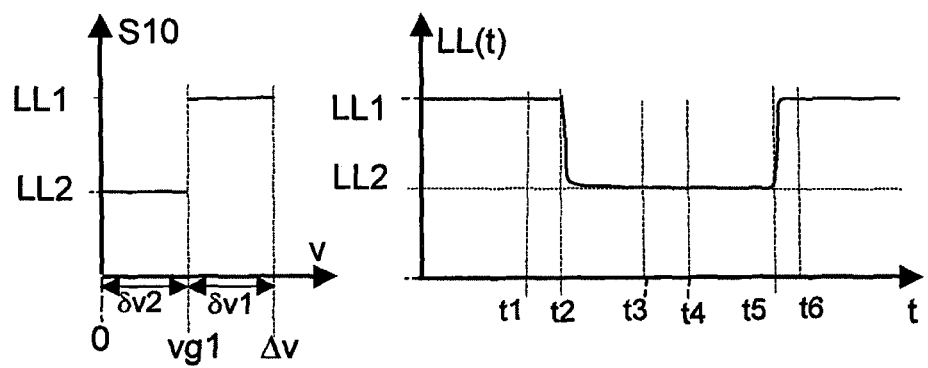
FIG. 4 shows an illustration (left-hand side) of a setpoint value of the power of the laser beam as function of the speed of the machining head and an illustration (right-hand side) along a chronological progression of the power of the laser beam, which corresponds to the chronological progression of the speed of the machining head of the laser cutting system according to FIG. 3.
Figure 5:
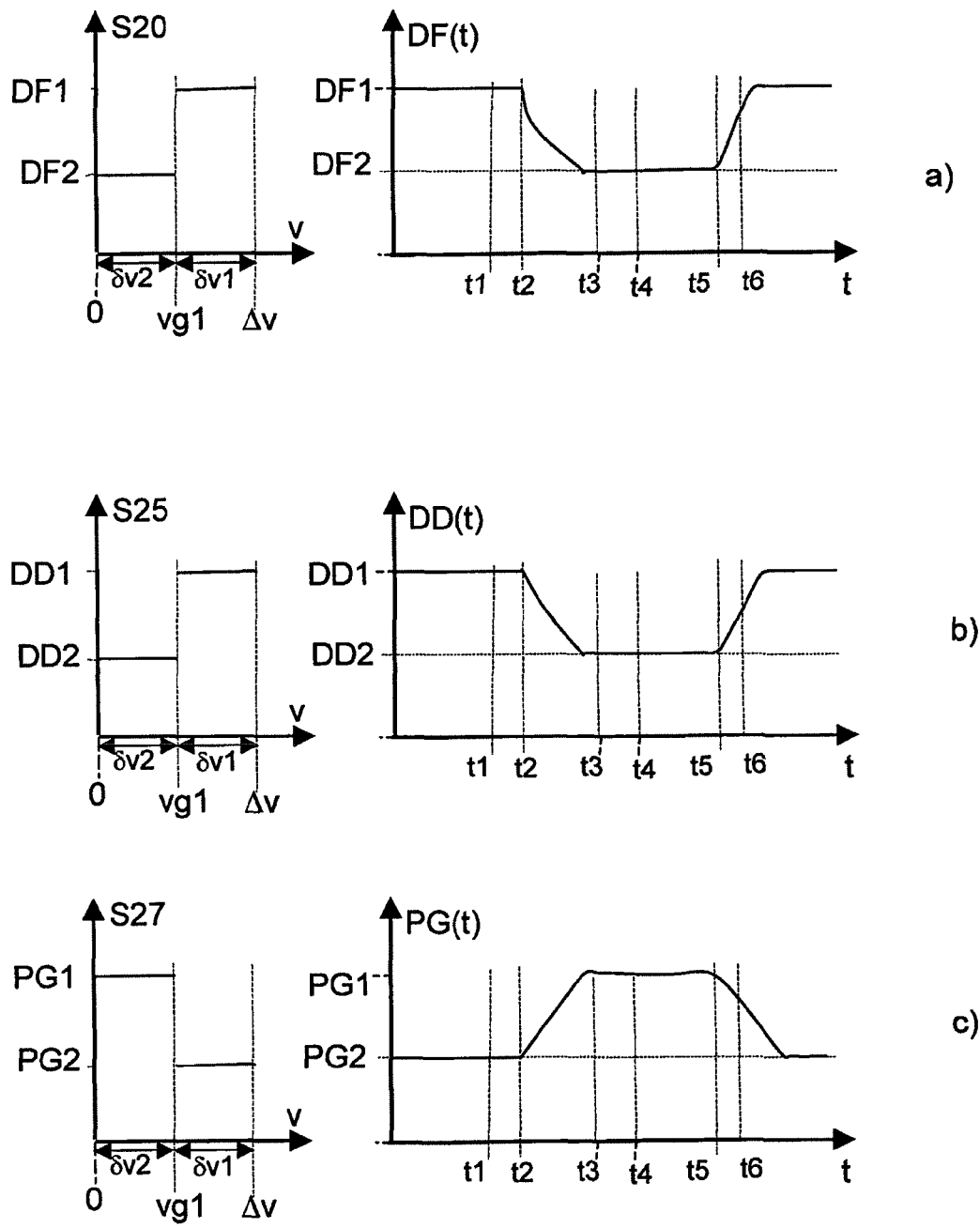
Figure 6:
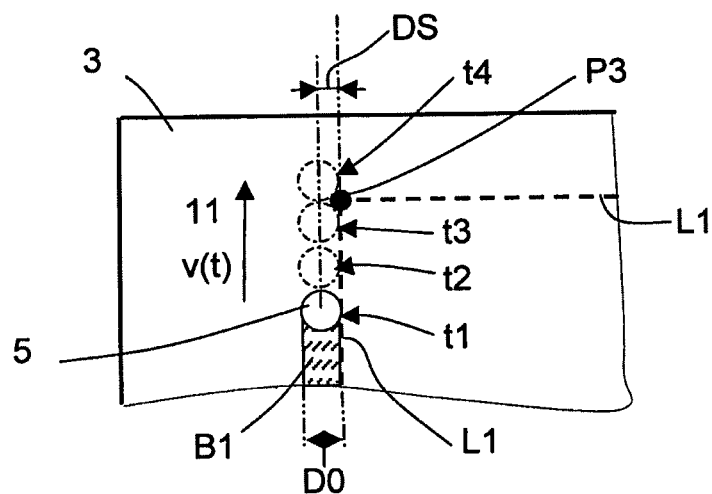
Figure 7:
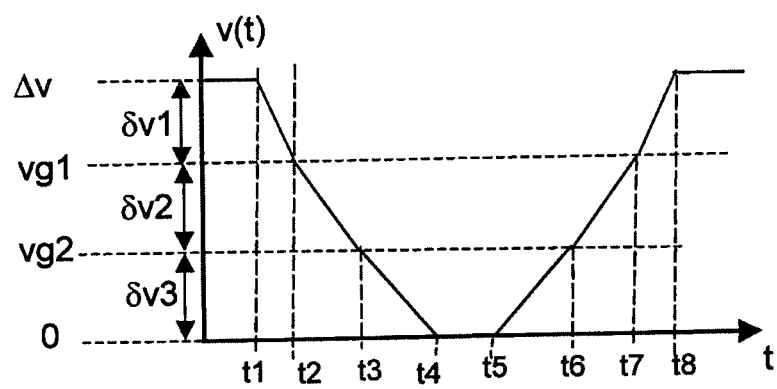
Figure 8:
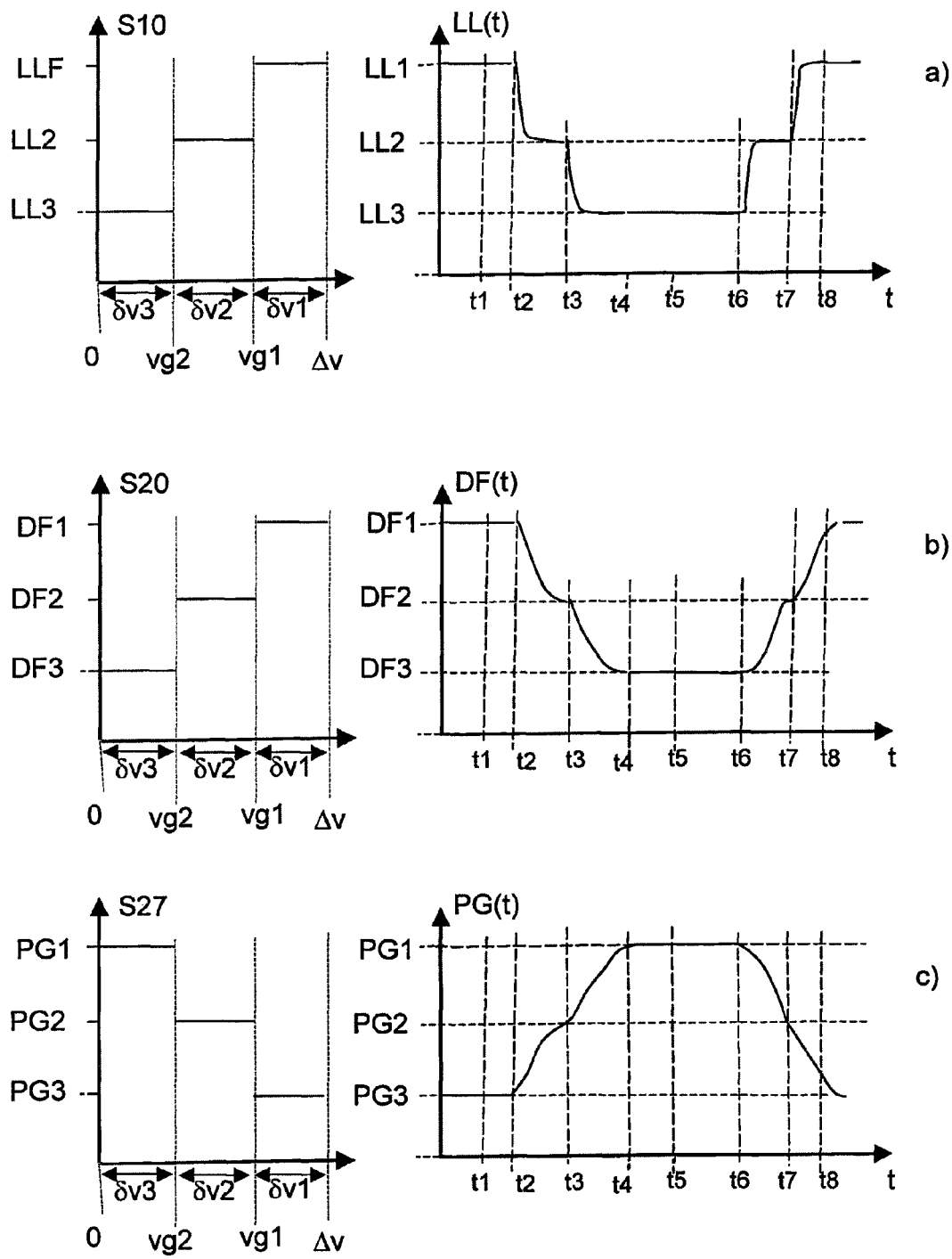
Figure 9:
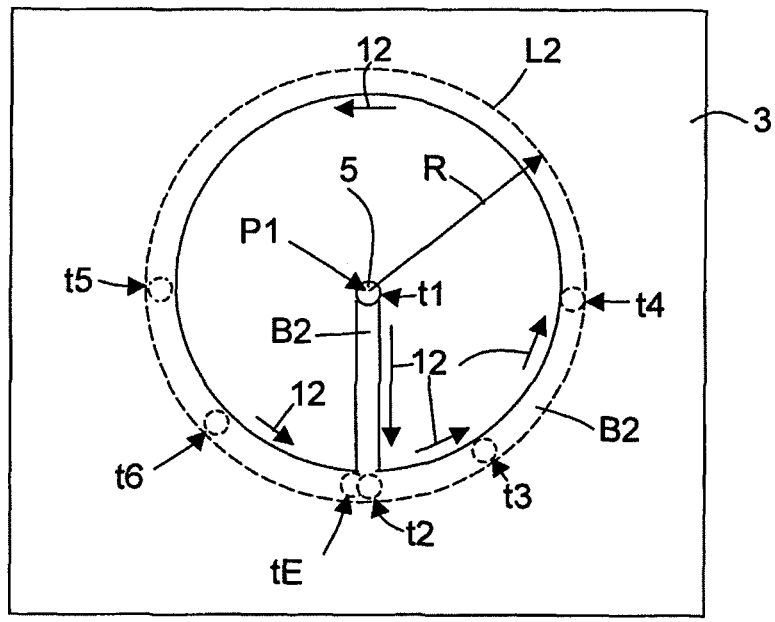
Figure 10:
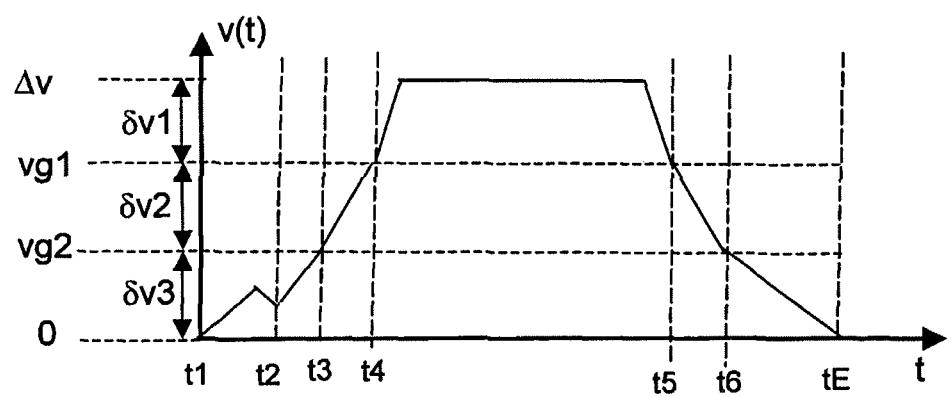

FIG. 5 a) like the illustrations according to FIG. 4, but for the position of a focusing optics of the machining head according to FIG. 1;

b) like the illustrations according to FIG. 4, but for the position of a process gas nozzle of the machining head according to FIG. 1;

c) like the illustrations according to FIG. 4, but for the pressure of a process gas;

FIG. 6 like FIG. 2, but with different positions of the laser beam depending on the time;

FIG. 7 shows a chronological progression of the speed of the machining head of the laser cutting system according to FIG. 1 in response to the cutting along the cutting line according to FIG. 6;

FIG. 8 a) shows an illustration (left-hand side) of another alternative for the setpoint value of the power of the laser beam depending on the speed of the machining head and an illustration (right-hand side) of a chronological progression of the power of the laser beam, which corresponds to the chronological progression of the speed of the machining head of the laser cutting system according to FIG. 7;

b) like a), but for the position of a focusing optics of the machining head according to FIG. 1;

c) like a), but for the pressure of a process gas;

FIG. 9 shows a schematic illustration of a circular cutting line on a workpiece and of a cutting path of a laser beam, which follows the cutting line, and of the respective position of the laser beam for different points in time;

FIG. 10 shows a chronological progression of the speed of the machining head of the laser cutting system according to FIG. 1 in response to the cutting along the cutting line according to FIG. 9.

FIG. 1 shows a laser cutting system 1 according to the invention for cutting a workpiece with a laser beam 5. The laser cutting system 1 comprises a laser 4 for creating the laser beam 5, a movable machining head 10 for placing the laser beam 5 on the respective workpiece and a control device 20 for controlling a movement of the machining head 10 along a cutting line relative to the respective workpiece and for controlling a plurality of process variables of a cutting process.

The laser cutting system 1 further comprises a user interface 45, via which a user of the laser cutting system 1 can supply the control device 20 with user data BD, if necessary, which include the definition of a cutting job, which is to be carried out by the laser cutting system 1. In the instant case, the user interface 45 is a component of the control device 20.

In the instant example, the laser cutting system 1 is illustrated in response to the cutting of a workpiece 3 along a cutting line L1. In the instant case, L1 is a rectangle with four corner points P1, P2, P3 and P4, which in each case mark a change in direction of 90°. Accordingly, the user data BD include the coordinates of these corner points P1, P2, P3 and P4 for the definition of a corresponding cutting job. As is illustrated, the user data furthermore comprise a specification of the minimum path accuracy ΔB, which must in each case be maintained in response to the cutting, that is, of the respectively admissible maximum deviation of the respective cutting path of the laser beam 5 from a cutting curve for the case of "small" (minimal) changes in direction. In the instant example, a value B0 is assigned to ΔB. The cutting path of the laser beam 5, which is created according to the instant example and which follows the cutting line L1, is identified with B1 in FIG. 1.

As is indicated in FIG. 1, the machining head 10 has an adjustable focusing optics 15 for focusing the laser beam 5 onto the workpiece 3. A nozzle 16 for process gases, by means of which the respective process gas can be guided onto the workpiece 3 in the direction of propagation of the laser beam 5, is furthermore arranged at the machining head 10—at the side facing the workpiece 3.

While carrying out a cutting process, the control device 20 must control a number of variable variables and can control a number of actuators for this purpose, which influence these variable variables—dependent on the respective control signals.

The respective position of the machining head 10, which is determined by coordinates x, y, z, can be influenced by means of an actuator 50.0 for positioning the machining head 10, which comprises a plurality of drives, so as to be able to change the spatial position of the machining head 10 by superpositioning three movements, which are independent on one another, in three different directions X, Y, Z. An arrow 11 specifies the current direction of movement of the machining head 10 in each case and thus the direction of the speed v of the machining head 10.

The control device further controls a quantity G of process variables of the cutting process. A first subset G1 of the process variables exclusively comprises process variables, which influence the power of the laser beam available for cutting, while a second subset G2 of the process variables exclusively comprises process variables, which have no influence on the power of the laser beam available for cutting.

In the instant example, the subset G1 comprises the following process variables of the cutting process:
  the power LL of the laser beam 5
  a pulse duration Tp of a laser pulse
  a chronological spacing ΔT between subsequent laser pulses In the instant example, the subset G2 comprises the following process variables of the cutting process:
  the spatial position DF of the focusing optics 15 for focusing the laser beam 5 relative to the workpiece 3
  the beam diameter D0 of the laser beam 5
  a specification of an operating mode ModL of the laser 4 for creating the laser beam 5 (either continuous operation or pulsed operation of the laser 4)
  a specification of a path accuracy δB (deviation of the cutting path from the specified cutting line)

a spatial displacement DS of the focal point of the laser beam relative to the cutting line, so as to attain that the edge of the cutting path corresponds to the cutting line (path correction)

the spatial position DD of the nozzle 16 for process gas relative to the workpiece 3 a specification AG of a type of a process gas the respective pressure PG of a process gas It is pointed out that the afore enumeration of process variables of the subset G2 is not final: it goes without saying that the enumeration can be supplemented by adding further process variables, which fulfill the mentioned definition for the subset G2 from the point of view of a person of skill in the art.

The process variables of the subset G1 can be influenced by means of actuators 50.10, 50.11 and 50.12. For this purpose, the control device 20 can control them by means of control signals, which in each case represent setpoint values S10, S11 or S12, respectively, of these process variables.

The process variables of the subset G2 can be influenced with actuators 50.20-50.27. For this purpose, the control device 20 can control them by means of control signals, which in each case represent setpoint values S20-S27 of these process variables.

The following Table I provides an overview of the respective variable variables and actuators and of respectively corresponding setpoint values:

TABLE I

| Variable | Actuator | Setpoint Value | Meaning |
| --- | --- | --- | --- |
| x, y, z | 50.0 | S0 | Position machining head 10 |
| LL | 50.10 | S10 | Power of the laser beam 5 |
| Tp | 50.11 | S11 | Pulse duration |
| ΔT | 50.12 | S12 | Pulse spacing |
| DF | 50.20 | S20 | Position of the focusing optics |
| D0 | 50.21 | S21 | Beam diameter |
| δB | 50.22 | S22 | Path accuracy |
| ModL | 50.23 | S23 | Operating mode of the laser |
| DS | 50.24 | S24 | Displacement of the focal point |
| DD | 50.25 | S25 | Position of the nozzle for process gas |
| AG | 50.26 | S26 | Type of a process gas |
| PG | 50.27 | S27 | Pressure of a process gas |

The control device 20 comprises a bus 20.1, which provides for a communication of all of the components of the control device 20 among one another (a communication by transmitting data or signals is indicated in FIG. 1 by means of arrows). The significant components of the control are: a processor 21; a program memory 25, which comprises an operating system and all of the control programs of the control device 20; a memory 40 for data; the user interface 45 and control units 30.1, 30.2, 30.3 and 30.4.

The control unit 30.1 controls the respective movement of the machining head 5 and is capable of transmitting control signals to the actuator 50.1 for this purpose, with said control signals representing the respective setpoint value S0 of the position (x, y, z) of the machining head 10.

The actuators 50.22, 50.24 and 50.25 can be controlled by the control unit 30.1 for controlling the movement of the machining head 10 and in turn act on the actuator 50.0 to influence the position (x, y, z) of the machining head 10 depending on setpoint values S22, S24 and S25. It is attained through this that the path accuracy δB can be adapted situationally by controlling the processor 21 and the respective control programs of the control device 20 and/or the displacement DS of the focal point can be changed relative to the respective cutting line (path correction) and/or the position DD of the nozzle 16 can be changed.

The control unit 30.2 serves to control the laser 4 and is capable, for this purpose, to transmit control signals to the actuators 50.10, 50.11, 50.12 or 50.23, respectively, with said control signals representing the respective setpoint value S10 of the power LL of the laser beam 5, the respective setpoint value S11 of the pulse duration Tp, the respective setpoint value S12 of the pulse spacing ΔT and the respective setpoint value S23 for the operating mode of the laser 4.

The control unit 30.3 serves to control the focusing optics 15 and is capable, for this purpose, to transmit control signals to the actuators 50.20 and 50.21, with said control signals representing the respective setpoint value S20 for the position of the focusing optics 15 and the respective setpoint value S21 of the beam diameter D0 of the laser beam 5.

The control unit 30.4 serves to control the process gas supply and is capable, for this purpose, to transmit control signals to the actuators 50.26 and 50.27, with said control signals representing the respective setpoint value S26 for the type AG of a process gas and the respective setpoint value S27 for pressure PG of a process gas.

In the instant example, the respective setpoint values S10, S11, S12, S20, S21, S22, S23, S24, S25, S26 and S27 are variable parameters, which can be varied by the control device 20 depending on the speed v of the machining head 10.

To provide for a current adaptation of these parameters, the control device 20 has registering means 32 for registering the current speed v of the machining head 10. The registering means 32 are a component of the control unit 30.1 and have the object of registering the speed v at regular time intervals and to provide the respectively registered values of the speed v to the remaining components of the control device.

In the instant example, values assuming the respective setpoint values S10, S11, S12, S20, S21, S22, S23, S24, S25, S26 and S27 as function of the speed v, are stored in the storage 40 for different speed values. In so doing, a functional dependency of the respective setpoint values on the speed v is implemented in the control unit 20.

During operation of the laser cutting system 1, the current speed v is monitored. Dependent on changes of the current speed, the individual actuators 50.10, 50.11, 50.12, 50.20, 50.21, 50.22, 50.23, 50.24, 50.25, 50.26 and 50.27 are controlled by means of control signals, which represent changed values for the setpoint values S10, S11, S12, S20, S21, S22, S23, S24, S25, S26 and S27 under certain conditions, which are determined in the control programs of the control device 20. In so doing, process variables, which are assigned to the respective actuators, can be influenced in each case depending on the speed of the machining head 10.

It is pointed out that not all setpoint values S10, S11, S12, S20, S21, S22, S23, S24, S25, S26 and S27 must be changed under the same conditions and at the same time.

FIGS. 2-5 show a first example of how changes of the respective process variables can be initiated in the case of the laser cutting system 1.

According to FIG. 2, it is assumed that the laser beam 5 is moved along the predetermined cutting line L1 in the direction of the arrow 11 at the speed v(t) and with a spatial displacement D5, so as to create a cutting path B1 with the width D0 along the cutting line L1. At the point P3, the cutting line L1 encompasses a corner with an angle of 90° (change in direction). In the illustrated situation, the focal point of the laser beam 5 initially moves to the corner at the point P3, so as to subsequently change the direction by 90° at the point P3. The respective positions of the laser beam 5 are illustrated in FIG. 1—by means of circles consisting of solid lines—at three different points in time t1, t2, t3.

Figure 3:
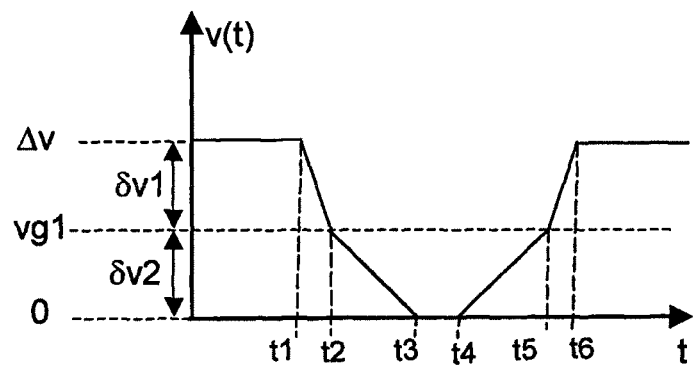
FIG. 3 shows a chronological progression of the speed of the machining head of the laser cutting system according to FIG. 1 in response to the cutting along the cutting line according to FIG. 2.

FIG. 3 shows the corresponding progression of the speed v(t) at which the laser beam 5 moves along the cutting line L1 so as to maintain a predetermined path accuracy. As can be seen, the laser beam can be moved at a maximum speed v=Δv in the respective sections of the cutting path B1, which are spaced apart from the point P3, while the speed in the time period t1 to t3 is recued to v=0 in response to the movement to the point P3. The speed v is accordingly varied as a whole in a speed range of the width Δv.

It is assumed in the instant example that the speed range Δv consists of two adjoining partial ranges δv1 and δv2, which are separated by a speed vg1, wherein the partial range δv1 lies above the limit speed vg1 and the partial range δv2 lies below the limit speed vg1. In the instant case, the limit speed vg1 falls below the upper speed range δv1 at the point in time t2 and is exceeded by the lower speed range δv2 at the point in time t5.

As is indicated in FIGS. 4 and 5, it is assumed in the instant case that each of the setpoint values of the respective process variables is in each case constant in both partial ranges δv1 and δv2, wherein each of the setpoint values in both partial ranges δv1 and δv2 in each case assumes different values. Each of the setpoint values can accordingly only assume two different values in the overall speed range Δv.

In the event that the speed v is in the upper speed range δv1, that actuator, which is assigned to a certain process variable, is controlled with a signal, which represents that setpoint value, which is assigned to the upper speed range δv1. In the event that the speed v falls below the speed vg1 and transitions into the lower speed range δv2, that actuator, which is assigned to a certain process variable, is controlled with a signal, which represents that setpoint value, which is assigned to the lower speed range δv2. In response to the transition of the speed v from the lower speed range δv2 into the upper speed range δv1, a signal is again created analogously, which represents that setpoint value, which is assigned to the upper speed range δv1. According to this, the respective process variable is in each case switched back and forth between two values in the time period between t1 and t6.

According to this, FIG. 4 shows the setpoint value S10 depending on the speed v in the partial ranges δv1 and δv2 and the chronological progression of the power LL of the laser beam 5, which results from the chronological progression of the speed v according to FIG. 3 and the functional dependency of the setpoint value S10 depending on the speed v.

According to this, FIG. 5 shows the setpoint values S20, S25 and S27 depending on the speed v in the partial ranges δv1 and δv2 and the chronological progressions of the position DF of the focusing optics, of the position DD of the nozzle 16 for process gas and of the pressure PG of a process gas, with said chronological progressions resulting from the chronological progression of the speed v according to FIG. 3 and the functional dependencies of the setpoint values S20, S25 and S27 as function of the speed v.

It is pointed out that the chronological progressions of the respective process variables in response to the transition of the speed v from one of the partial ranges δv1 or δv2, respectively, to the respective other partial range, substantially depend on the dynamic behavior of the respective actuators. While the respective actuators are in each case controlled by means of a constant signal (which corresponds to the respective setpoint value) after exceeding or falling below the limit speed, the time it takes for the respective process variables to reach the predetermined setpoint value may vary. Some process variables display an abrupt (erratic) transition as function of the time (e.g. the laser power LL according to FIG. 4) in response to the exceeding of the limit speed vg1, while other process variables display a continuous transition as function of the time (e.g. the variables DF, DD and PG according to FIG. 5).

The progression of the speed v illustrated in FIG. 3 as function of the time t is only one of a plurality of possible alternatives, according to which the control device 20 could control the movement of the machining head 10 along the cutting line L1 according to FIG. 2—depending on how the control device 20 is configured. Contrary to the progression illustrated in FIG. 3, the control device 20 could be configured such, for example, that the machining head 10 carries out the provided change in direction by 90° immediately after reaching the point P3 at the time t3 and is accelerated again immediately at the time t3. According to this alternative, the speed v would only equal 0 at the point in time t3, the speed v could continuously rise to the value Δv for t>t3. In a further alternative, the control device 20 could be configured such, for example, that the machining head 10 carries out the change in direction at the point P3 at a speed, which is reduced as compared to the value Δv, but which never equals 0 during the entire chronological progression. In this case, the machining head 10 remains in motion during the change in direction at the point P3.

FIGS. 6-8 show a further example of how changes of the respective process variables can be initiated in the case of the laser cutting system 1.

The example according to FIGS. 6-8 is similar to the example according to FIGS. 2-5 in that the cutting line L1 according to FIG. 6 is identical to the cutting line in FIG. 2, that is, a corner at the point P3 is to be cut in the instant example with an angle of 90°, wherein the cutting path B1 is to be cut at relatively large distances from the point P3 at the maximum cutting speed v=Δv and the speed in the area of the point P3 is reduced to v=0. According to this, the speed v covers a speed range Δv.

Contrary to the example according to FIGS. 2-5, the sped range Δv in the example according to FIGS. 6-8 is broken down into three adjoining partial ranges δv1, δv2 and δv3, wherein two adjacent partial ranges (δv1 and δv2 or δv2 and δv3, respectively) are in each case separated by a limit speed vg1 or vg2, respectively. In this example, three speed ranges or two limit speeds, respectively, are thus passed subsequently in three time intervals between the points in time t1 and t4 (FIG. 7).

It is assumed in the instant example that the setpoint value of one of the process variables in each of the partial ranges δv1, δv2 and δv3 in each case assumes a constant value, wherein the values assigned to the different ranges, are different in each case. The functional dependency of the setpoint value of a process variable can accordingly be characterized in the entire speed range Δv by means of three different values. FIG. 8 shows corresponding examples for the dependency of the setpoint values S10, S20 and S27. According to this, the respective actuators are controlled subsequently by means of different signals, which in each case represent three different setpoint values. According to this, the chronological progressions of the respective process variables LL, DF and PG in each case also show three stages, which correspond to the three different values, which the setpoint values S10, S20 and S27 can assume in the different partial ranges δv1, Δv2 and Δv3.

The progression of the speed v illustrated in FIG. 7 as function of the time t is only one of a plurality of possible alternatives, according to which the control device 20 could control the movement of the machining head 10 along the cutting line L1 according to FIG. 6—depending on how the control device 20 is configured. Contrary to the progression illustrated in FIG. 7, the control device 20 could be configured such, for example, that the machining head 10 carries out the provided change in direction by 90° immediately after reaching the point P3 at the time t4 and is accelerated again immediately at the time t4. According to this alternative, the speed v would only equal 0 at the point in time t4, the speed v would continuously rise to the value Δv for t>t4. In a further alternative, the control device 20 could be configured such, for example, that the machining head 10 carries out the change in direction at the point P3 at a speed, which is reduced as compared to the value Δv, but which never equals 0 during the entire chronological progression. In this case, the machining head 10 remains in motion during the change in direction at the point P3.

FIGS. 9 and 10 show a further example for cutting at a variable cutting speed.

FIG. 9 shows a workpiece 3 with a circular cutting line L2 with a radius R. In the instant example, the cutting process begins in that a hole is drilled in the center P1 of the cutting line L2 at the point in time t1 by means of the laser beam 5. The speed of the machining head at the point in time t1 is thus v=0. Arrows, which are provided with reference numeral 12, identify the travel of the machining head 10 during the cutting process. The current position of the laser beam 5 at different points in time t1, t2, t3, t4, t5, t6 and tE is identified in FIG. 9 by means of individual circles with solid or dashed lines, respectively. Based on the point P1, the laser beam 5 or the machining head 10, respectively, is initially accelerated radially in the direction towards the cutting line L2 and, shortly before the laser beam 5 has reached the cutting line L2 at the point in time t2, is slightly slowed down again. Subsequently, the cutting path B2—after the change in direction by 90°— follows the inner side of the cutting line L2 and is thereby accelerated again until the maximum speed Δv has been reached (point in time t4) after approx. a fourth of the circumference of the cutting line. This maximum speed is maintained until the workpiece 3 has been cut along a segment of a circle, the length of which is approximately ¾ of the entire periphery of the cutting line L2 (point in time t5). Subsequently, the speed v is gradually reduced to v=0 until the cutting process can be ended (point in time tE). The circle assigned to the point in time tE in FIG. 9 identifies the position, which the laser beam 5 assumes at the end of the cutting path B2, with said end having been reached after one rotation in the direction of the arrow 12 along the cutting line L2.

FIG. 10 shows the corresponding chronological progression of the speed. Similarly as in the example according to FIGS. 6-8, the speed range Δv according to FIG. 10 is divided into three adjoining partial ranges δv1, δv2 and δv3. It can accordingly be assumed that the setpoint value one of the process variables in each case assumes a constant value in each of the partial ranges δv1, δv2 and δv3, wherein the values assigned to the different ranges are different in each case. According to this, the respective process variables can be adapted in three different steps (as in the example according to FIGS. 6-8).

It goes without saying that it is also possible to divide the speed range Δv into more than three partial ranges and to determine the functional dependency of the setpoint values of the process variables on the speed by means of more than three constant values.

It can be advantageous in the mentioned examples according to FIGS. 2-5 or FIGS. 6-8, respectively, or FIGS. 9-10, respectively, when the control of the respective actuators is initiated by the control device 20 in response to a transition of the speed v of the machining head 10 between two adjoining partial ranges δv1 and δv2 or δv2 and δv3, respectively, only when the speed of the machining head 10 is in that partial range, in which the transition takes place, at least for a predetermined period of time. For this purpose, the control device is embodied such that the control device determines the respective period of time, within which the respective speed of the machining head lies within the partial range, in each case in advance and the respective control signal is only created when the respectively determined period of time is greater than a predetermined value. It is attained with this measure that a change of a setpoint value is suppressed when the change of the setpoint value is not effective longer than a predetermined period of time. In the example according to FIGS. 9-10, a control signal, which represents a setpoint value, could only be created by the control device 20 when the time difference t5-t4 is greater than a predetermined minimal period of time Δt.

The invention claimed is:

1. A laser cutting system for cutting a workpiece with a laser beam along a cutting line at a variable cutting speed, comprising:
    a movable machining head configured to place the laser beam on the respective workpiece,
    a user interface for specifying the respective cutting line and for specifying a minimum path accuracy of the laser beam,
    a control device configured to control a movement of the machining head along the cutting line relative to the respective workpiece and for controlling a plurality of process variables of a cutting process,
    wherein said movement during the cutting process can create a cutting path of the laser beam along the cutting line,
    wherein the control device
        is configured such that the movement of the machining head can be controlled by the control device during the cutting process such that the cutting path of the laser beam follows the cutting line within the minimum path accuracy (ΔB), wherein a kinematic state of the machining head can be changed by the control device by increasing or reducing the speed of the machining head relative to the workpiece, and
        wherein the control device including a register configured to dynamically receive and register at least one of a change of the kinematic state of the machining head and/or at least of a value of the current speed of the machining head and/or of a value for a change of the current speed of the machining head,
    a first subset and a second subset is formed from the plurality of process variables, wherein the first subset comprises exclusively one or a plurality of process variables, which influence the power of the laser beam available for cutting, and wherein the second subset comprises exclusively one or a plurality of process variables, which have no influence on the power of the laser beam available for cutting,
    at least one process variable of the first subset is changed via the control device based on a change of the kinematic state of the machining head depending on at least one of the respectively registered values for the current speed of the machining head and/or at least one of the respectively registered values for change of the current speed of the machining head, at least one process variable of the second subset is changed via the control device based on a change of the kinematic state of the machining head depending on the current speed of the machining head, wherein the change of the respective process variable can be controlled depending on at least one variable control parameter, the respective value of which can be determined by the control device based on rules implemented in the control device depending on at least one of the respectively registered values of the current speed of the machining head and/or of at least one of the respectively registered values for a change of the current speed of the machining head.

2. The laser cutting system according to claim 1, wherein the register dynamically receives and registers a value of the current speed of the machining head, and the at least one process variable of the first subset is changed via the control unit based on a change in the value of the current speed of the machining head.

3. The laser cutting system according to claim 1, wherein the first subset of the process variables comprises at least one of the following process variables (i)-(iii):
 (i) the power of the laser beam,
 (ii) a pulse duration of a laser pulse,
 (iii) a chronological spacing between subsequent laser pulses and/or a laser pulse rate,
 and wherein the second subset of the process variables comprises at least one of the following process variables (iv)-(xi)
 (iv) a specification of a position of a focusing optics for focusing the laser beam relative to the workpiece,
 (v) a specification of a beam diameter of the laser beam,
 (vi) a specification of an operating mode of a laser for creating the laser beam,
 (vii) a specification of a path accuracy,
 (viii) a spatial displacement of a focal point of the laser beam relative to the cutting line,
 (ix) position of a process gas nozzle relative to the workpiece,
 (x) a specification of a type of a process gas,
 (xi) a pressure of a process gas.

4. The laser cutting system according to one of claim 3, wherein the respective process variable can be influenced with at least one actuator, which is assigned to this process variable, and the respective actuator can be controlled by means of a control signal, which can be created by the control device and which represents a setpoint value of the process variable, wherein the setpoint value is the variable control parameter.

5. The laser cutting system according to claim 4, wherein
 the setpoint value of the respective process variable is a function of the speed of the machining head and
 a functional dependency of the setpoint value of the process variable on the speed of the machining head is implemented for the process variable in the control device
 and the control device can create at least one control signal for controlling the actuator, which is assigned to this process variable, with said control signal representing that setpoint value of the respective process variable, which is assigned to one of the respectively registered values for the speed of the machining head according to the implemented functional dependency of the setpoint value of the respective process variable on the speed of the machining head.

6. The laser cutting system according to claim 5, comprising a storage, which can be accessed by the control device and in which the respective values, which the setpoint value assumes for predetermined values of the speed of the machining head, are stored.

7. The laser cutting system according to claim 5, wherein the laser cutting system comprises an implementation of an algorithm, which can be carried out by the control device, for computing the respective setpoint value for a predetermined value of the speed.

8. The laser cutting system according to claim 5, wherein the speed of the machining head can be changed via a predetermined speed range and the functional dependency of the setpoint value of the process variable on the speed of the machining head is implemented such that different partial ranges of the predetermined speed range are defined and that the setpoint value of the process variable in each case assumes different values in at least two of the partial ranges.

9. The laser cutting system according to claim 8, wherein the setpoint value of the process variable in each case assumes a constant value in each of the partial ranges.

10. The laser cutting system according to claim 8, wherein the machining head can be accelerated during the change of the kinematic state of the machining head such that the speed of the machining head reaches or falls below a lower limit speed of a certain partial range or that the speed of the machining head reaches or exceeds the respectively lower limit speed of a plurality of certain partial ranges of the predetermined speed range successively.

11. The laser cutting system according to claim 10, wherein the respective reaching or exceeding of the lower limit speed of the respective partial range can be registered by means of the registering means
 and
 a control signal for controlling the actuator can be created after the registration of the respective reaching or exceeding of the lower limit speed of the respective partial range, wherein the respective control signal represents a setpoint value, which is assigned to a value of the speed within the respective partial range, which is registered by the control device.

12. The laser cutting system according to claim 8, wherein the machining head can be slowed down during the change of the kinematic state of the machining head in response to a movement of the machining head such that the speed of the machining head reaches or falls below an upper limit speed of a certain partial range or that the speed of the machining head reaches or falls below the respective upper limit speed of a plurality of certain partial ranges of the predetermined speed range successively.

13. The laser cutting system according to claim 12, wherein the respective reaching or falling below of the upper limit speed of the respective partial range can be registered by the control device
 and
 a control signal can be created for controlling the actuator after the registration of the respective reaching or falling below of the upper limit speed of the respective partial range, wherein the respective control signal represents a setpoint value, which is assigned to a value of the speed within the respective partial range, which is registered by the control device.

14. The laser cutting system according to claim 12,
 wherein the period of time, within which the respective speed of the machining head lies within the partial range, is in each case determined in advance by the control device and that the control signal can only be created when the respectively determined period of time is greater than a predetermined value.

15. The laser cutting system according to claim 12, wherein the change of the kinematic state can be carried out:
   a) in the event that the cutting line comprises at least one section, which encompasses a change in direction in response to a movement of the machining head towards a change in direction and/or
   b) at the end of the cutting process before an end point of the cutting line has been reached.

16. The laser cutting system according to claim 15, wherein the change of the kinematic state can be carried out:
   a) in the event that the cutting line comprises at least one section, which encompasses a change in direction, in response to a movement of the machining head away from a change in direction and/or
   b) at the beginning of the cutting process in response to a movement of the machining head directed away from a starting point of the cutting line.

* * * * *